United States Patent [19]
Coquin

[11] Patent Number: 4,563,063
[45] Date of Patent: Jan. 7, 1986

[54] SUN SHADE AND HOLDING DEVICE

[76] Inventor: Jean C. Coquin, 15, rue Jean Bologne, 75016 Paris, France

[21] Appl. No.: 564,320

[22] Filed: Dec. 22, 1983

Related U.S. Application Data

[62] Division of Ser. No. 244,951, Mar. 18, 1981, Pat. No. 4,443,061.

[30] Foreign Application Priority Data

Mar. 20, 1980 [FR] France ............................ 80 06225

[51] Int. Cl.⁴ ............................................. G03B 11/04
[52] U.S. Cl. ..................................... 350/580; 350/318
[58] Field of Search ................ 350/580, 581, 319, 318

[56] References Cited

FOREIGN PATENT DOCUMENTS 962345 6/1950 France ................................ 350/580

*Primary Examiner*—Jon W. Henry
*Attorney, Agent, or Firm*—Cushman, Darby & Cushman

[57] ABSTRACT

A sun shade for releasable connection with radially-extending, opposite clips on an annular accessory for the lens of a still camera includes an annular shade portion and two opposite latches projecting from the annular portion in an axial direction, each of the latches having at least one opening therein facing in a radial inward direction relative to the annular portion to receive clips on the accessory. The inner surface of the annular portion has radially inwardly projecting clips the size and spacing of which are complementary to those of the openings in the latches. The inner surface of the annular portion also has outwardly extending recesses the size and spacing of which correspond to those of the openings in the latches.

8 Claims, 6 Drawing Figures

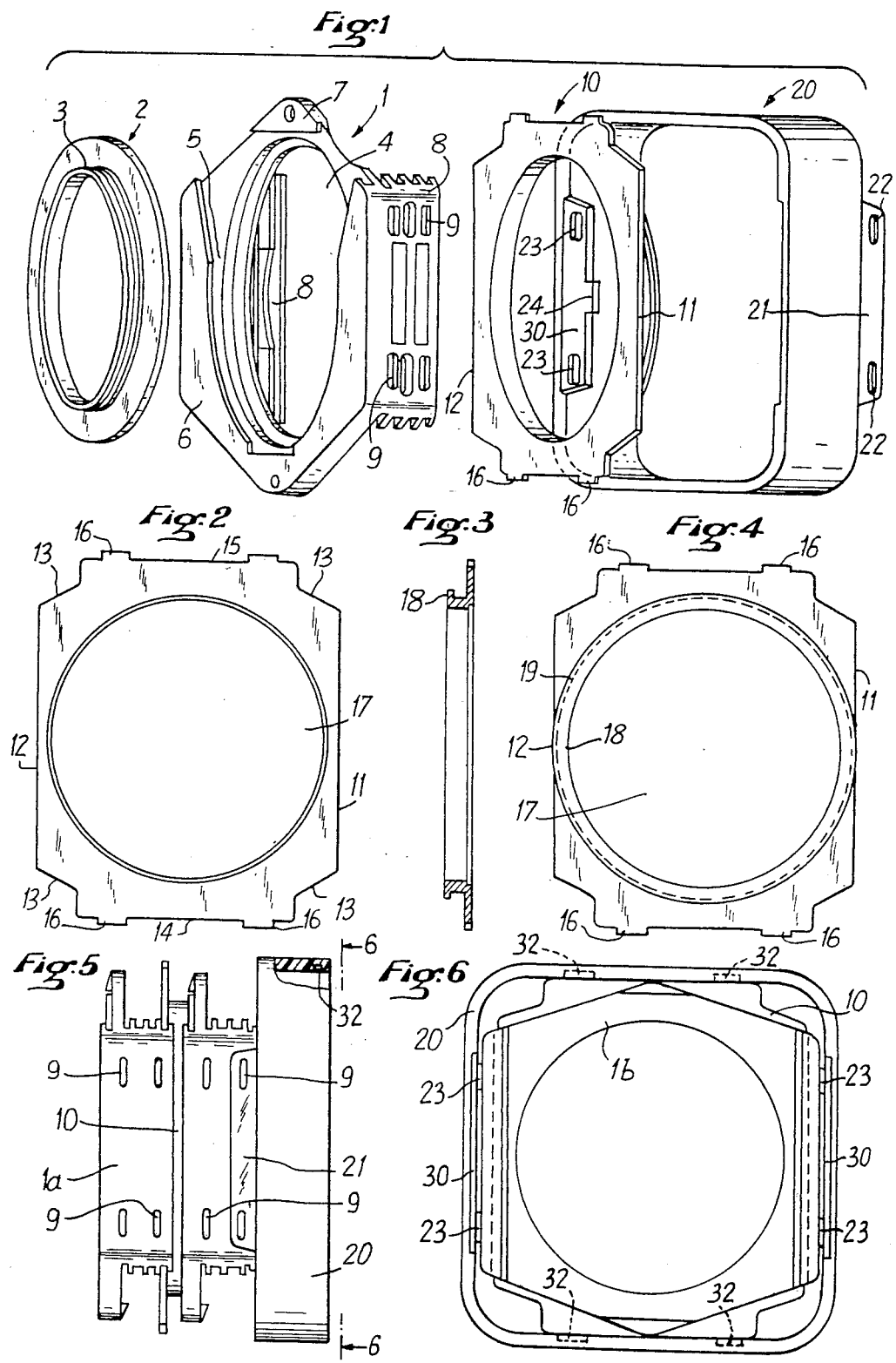

SUN SHADE AND HOLDING DEVICE

This is a division of application Ser. No. 244,951 filed Mar. 18, 1981, now U.S. Pat. No. 4,443,061.

This invention relates to a sun shade for use with an accessory-holding device for a camera. In particular the sun shade is adapted for use with an accessory-holding device which includes an annular body, an intermediate assembly component, or adaptor ring extending from the body of the lens assembly of the still camera, said assembly component being made of a removable annular ring, equipped with an outer thread for screwing onto the lens assembly, said ring adapted to being placed in a corresponding area of said body so as to enable a relative rotation movement of said body in relation to said lens assembly, said body also displaying on its side opposite the area of said ring at least one pair of grooves which make it possible to accommodate various photographic accessories, especially filters.

The accessory accommodation grooves are present inside generally parallel, opposite side plates, outwardly offset perpendicular to the annular body.

In a preferred construction, the area of the annular body for accommodating the adaptor ring is an annular groove extending around most of a circular aperture in said body, the size of the groove corresponding to the outer diameter of the adaptor ring, a lug being provided to retain the adaptor ring in the groove while enabling relative rotation between the ring and the body.

The annular body is also equipped with means enabling the placement of an additional component, especially a sun shade, which preferably is a hollow casing, especially square-shaped with rounded edges.

The accessory-holding device disclosed herein brings refinements to the device summarized above so as to enable especially the assembly, onto a lens of a still camera, of several annular bodies, making it possible to place on the same lens a greater number of accessories such as filters and/or sun shades, the amount and the relative arrangement of the accessories being altered at will.

This invention also serves to refine the earlier device with respect to the characteristics of the annular body and the sun shade for placing the latter.

The device according to this invention is characterized mainly in including at least one adapting component which includes on the one hand a first means that enable it to be placed in the groove in the body which normally accommodates the adaptor ring, said first means making possible relative rotation of the adapting component in relation to the annular body while guaranteeing its lateral immobilization in said body, and on the other hand second means making possible the placement of the adapting component between the grooves in the opposite side plates of the body, said second means enabling sliding displacement in a translation motion of the adapting component in relation to said body.

With such characteristics, it is possible to place on the same lens assembly two bodies separated by one of the adapting components, such adapting component adapted to sliding in relation to the body placed on the lens assembly by way of an adaptor ring, the other body adapted to relative rotation movement in relation to the adapting component, or in relation to the first body and the lens assembly. By multiplying the number of adapting components, which thus each play the role of a turret, one can obviously arrange a corresponding number of bodies successively on the same lens assembly of a still camera.

In a specific construction, the means on said adapting component, enabling its rotation in relation to said body, includes a flange that protrudes radially from said component, and terminating in an end edge, each adapting component thus placed in the groove in a body in the same manner as an adaptor ring.

The means for said adapting component enabling its accommodation between the grooves in the side plates of the body are made of two straight parallel edge faces of the adapting component, formed in the shape of of a plate, the spacing of which corresponds to the distance between the bottom of the grooves in the side plates of said body, the thickness of the plate corresponding to the width of said grooves. The adapting component is thus placed in said body in the same manner as an accessory such as a plane filter, the mobility in translation motion of the adapting component in relation to the body thus making possible the alteration of the relative lateral arrangement of two bodies assembled on either side of said adapting component.

According to another characteristic of this invention, the body displays, preferably on the outer sides of its side plate parts such as protruding clips on which latches of an accessory such as a sun shade can fit through corresponding openings.

The sun shade of the present invention is a hollow, ring-shaped member adapted to be assembled to the above-described body, to the above-described adapting component or to another sun shade of the same kind. These alternative connections are made possible by the provision of properly located projecting clips and clip-receiving apertures or recesses. For connection to the body or to the adapting component the sun shade includes two parallel, axially projecting latches each having openings therein adapted to receive complementary clips projecting from the body or from the adapting component. The sun shade can also be connected to the body or the adapting component by means of radially outwardly facing recesses in the inner surface of the sun shade adapted to receive those same clips on the body or on the adapting component. For connecting the sun shade to another sun shade of the same kind the sun shade includes radially inwardly projecting clips on the inner surface of the sun shade adapted to receive the apertures in the latches of the other sun shade.

Advantageously, the adapting component according to the invention includes also protruding clips similar to those carried by the body and the sun shade and prone to fit inside cavities that form corresponding openings arranged for that purpose in the inner sides of the sun shade casing, opposite to those bearing said protruding clips.

Hence, at will, because of this invention, one can assemble on the same lens, in any desired succession, several bodies each equipped with accessories such as plane or circular filters, and several adapting components and/or sun shades.

Other advantages and characteristics of the invention will surface in the course of the following description of an example by referring to the appended drawing in which:

FIG. 1 is an exploded view in perspective of the main elements of the device according to the invention;

FIG. 2 is a front view of the adapting component of the assembly of FIG. 1;

FIG. 3 is a cross-sectional view of the adapting component;

FIG. 4 is a rear view of the adapting component;

FIG. 5 is a side view of a two-body assembly; and

FIG. 6 is an end view of the arrangement of FIG. 5 looking in the direction of arrows 6—6.

The device according to the invention is comprised of modular components illustrated in FIG. 1.

Among those modular components is a thin annular body 1 which is roughly hexagonal in shape with rounded corners. For the assembly of the body onto the lens assembly there is an adaptor ring 2, which includes an externally threaded annular radial flange 3 adapted to be screwed onto the threads normally present on lens asssemblies for still cameras.

The body 1, which may be a cast body, displays a central circular aperture 4 and on one of its sides an annular-shaped groove 5 which extends around most of the aperture 4, such groove being formed in the outer wall of the body 6.

The annular body 1 includes in its entry zone of the adaptor ring, inside groove 5, a roughly triangular-shaped lug 7 designed to retain the adaptor ring 2 inside inside the groove 5 of the body. The groove 5 extends across a little more than a halfcircle so as to maintain elastically the adaptor ring 2 which is fitted into it.

The annular body 1 of the device according to the invention includes also two parallel side plates 8, that face one another, on two opposing sides of the body.

Each of the side plates 8 includes on its inner side a plurality of grooves, each groove on one of the side plates facing one of the grooves in the other side plate.

The side plates 8 display also on their outer sides protruding clips 9, that number four on each cheek in the depicted example, the function of which will be described later.

In FIG. 1 we see, as well as in FIGS. 2 and 4, an adapting component designated overall as 10 in the shape of a roughly rectangular plate displaying two straight sides 11 and 12 brought together by set-backs 13 with two straight sides 14 and 15 each displaying two protruding clips 16 of which the spacing and the size are identical to the spacing and the size of the protruding clips 9 on the outer sides of the side plates 8 of body 1.

The plate that comprises the adapting component 10 includes a central circular aperture 17 defined by a flange 18 which protrudes radially from said component, itself defined by an end edge 19.

The dimensions of the plate that comprises the adapting component 10 are defined to enable cooperation between the adapting component 10 and the body 1 in the following manner.

First of all, the spacing between the straight parallel sides 11 and 12 is defined so as to enable the entry, as well as the sliding in a lateral translation motion, of the adapting component 10 between two grooves facing one another that are arranged in the opposing side plates 8 of the body component 1.

Also the dimensions of the flange 18 and its end edge 19 are selected so as to enable the entry of the adapting component 10 inside the groove 5 of the body 1 in lieu of an adaptor ring 2 and to allow, once the placement is achieved, a relative rotation movement of the adapting component 10 in relation to the body, while preventing lateral movement relative to the lug 7.

Hence one can achieve an assembly arrangement such as the one depicted in FIGS. 5 and 6 where two bodies 1a and 1b are placed on either side of an adapting component 10, the body 1a can be displaced in a translation motion in relation to the adapting component 10, therefore in relation to the body 1b, the latter also adapted to a relative rotation movement in relation to the adapting component 10, therefore to the body 1a. The body 1a can, in turn, be assembled directly on a lens by way of an assembly ring, such as the one depicted in 2 on FIG. 1. We can also anticipate other types of assembly by arranging successively several adapting components, therefore several bodies.

As depicted in FIG. 1 the device according to the invention includes as another modular component a sun shade designated universally as 20 formed as a hollow casing, made in one sequence, that is roughly square-shaped with rounded corners so as to exhibit four sides.

The sun shade 20 includes an annular portion of uniform thickness in a radial direction, this thickness being considerably smaller than the axial dimension of the sun shade 20. From each of two opposite sides of the annular portion a latch 21 extends in an axial direction away from the annular portion. Each latch 21 is provided with two openings 22, of which the size and spacing correspond to the size and spacing of the protruding clips 9 and 16, carried respectively by the side plates 8 of the body 1 and by the adapting component 10. In the illustrated embodiment the openings 22 extend through the latches 21. They may extend, however, only part way through the latches 21 from the radial inner surfaces thereof. Because of the cooperation between such protruding clips and such openings it is possible according to the invention to assemble a sun shade onto the body as depicted especially in FIG. 5 or else to assemble the sun shade on an adapting component 10.

In addition, within each of the two inner opposing sides of the sun shade 20 are two radially inwardly protruding clips 23, the size and spacing of which are identical to the size and spacing of the clips 9 and 16. The sun shade 20 can thus be assembled to another, identical sun shade by engaging the clips 23 of one sun shade in the openings 22 in the latches 21 of the other sun shade. Each pair of clips 23 reside in a recess 30 which is open in an axial direction opposite to the direction in which the latches 21 extend. Each recess 30 has an axial width, a length and a radial depth corresponding respectively to the axial width, the length and the radial thickness of a latch 21 so that the latter will be accommodated within the respective recess 30 when the clips 23 are inserted into the openings 22 of the latch 21.

Furthermore, as seen in FIG. 6 it is advantageous to equip the sun shade in its two inner sides opposite those bearing the protruding clips 23 with radially outwardly extending indentations 32, of which the spacing and size correspond to the openings 22 of the outer latches 21 of the sun shade. Hence one can place directly a sun shade onto an adapting component or on a body either by way of those recesses 32 in the inner side or by way of openings 22 on the outer latches 21. The indentations 32 can extend part way through or all the way through the radial thickness of the sun shade 20.

In summary, the sun shade 20 can be connected to the body 1 by insertion of the clips 9 on the body 1 into the openings 22 in the sun shade latches 21 or by insertion of the clips 9 into the indentations 32 in the sun shade 20. Similarly the sun shade 20 can be connected to the adapting component 10 by insertion of the clips 16 on the adaptor component 10 into the openings 22 on the sun shade latches 21 or by insertion of the clips 16 into the indentations 32 in the sun shade. Connection of one sun shade to another sun shade is effected by inserting the sun shade latches 21 of one sun shade into the recesses 30 in the other sun shade so as to engage the latch openings 22 of said one sun shade with the clips 23 on said other sun shade. Thus the openings 22 are used for engagement with the clips 9 on the body 1 or with the clips 16 on the plate 10 or with the clips 23 on another sun shade. The indentations 32 are used for engagement with the clips 9 or 16. The clips 23 of a given sun shade are used only to engage with openings 22 in another sun shade.

In view of what has just been described as concerns the various possibilities for assembling those components one in relation to another, one must understand that the assembly example of FIGS. 5 and 6, only illustrates a variation among many others, the number of those components and their relative arrangement can be multiplied at will according to the demands of snapshots, in relation especially to the number of filters or sun shades that the photographer wishes to use.

I claim:

1. A sun shade for releasable connection with radially-extending, opposite clips on an annular accessory for the lens of a still camera, said sun shade including an annular shade portion and two opposite latches projecting from the annular portion in an axial direction, each of said latches having at least one opening therein facing in a radial inward direction relative to the annular portion to receive clips on the accessory.

2. A sun shade as in claim 1 wherein there are at least two spaced-apart openings in each latch and wherein said annular shade portion has an inner surface having two opposite pairs of radially inwardly projecting clips the size and spacing of which are the same as those of said openings in said latches.

3. A sun shade as in claim 2 wherein said clips on said annular shade portion reside in recesses which are open in an axial direction with respect to the axis of the sun shade, said recesses being the same in size and shape as said latches to thereby accept the latches of another sun shade of the same type.

4. A sun shade as in claim 1 wherein there are at least two spaced-apart openings in each latch and wherein said annular shade portion has an inner surface having two opposite pairs of radially outwardly extending indentations the size and spacing of which are the same as those of said openings in said latches.

5. The combination of an annular sun shade with an annular accessory for the lens of a camera, said annular accessory having opposite clips extending radially outward, said sun shade including an annular shade portion and two opposite latches projecting from said annular portion in a common axial direction, each of said latches having at least one opening therein facing in a radial inward direction relative to said annular portion, the size and location of said openings being such that said openings can receive said clips on said accessory to releasably connect said sun shade to said accessory, and said annular portion having an inner surface having radially outwardly extending indentations the size, location and spacing of which are the same as those of said openings in said latches whereby said sun shade may alternatively be releasably connected to said accessory by engagement of said indentations with said clips.

6. The combination of claim 5, wherein said inner surface of said sun shade also has radially inwardly projecting clips the size and spacing of which are the same as those of said openings in said latches whereby said sun shade may be releasably connected to another sun shade of the same type by engagement of said inwardly projecting clips with the openings in the latches of the other shade.

7. A sun shade as in claim 6 wherein said clips on said annular shade portion reside in recesses which are open in an axial direction with respect to the axis of the sun shade, said recesses being the same in size and shape as said latches to thereby accept the latches of another sun shade of the same type.

8. A sun shade for releasable connection with radially extending, diametrically opposed clips on an accessory for the lens of a camera, said sun shade including an annular shade portion of generally square shape with rounded corners whereby said annular portion has in sequence first, second, third and fourth sides, a latch projecting away from the first and third sides of the annular portion in an axial direction, each latch having at least two clip-receiving openings therein facing in a radial direction relative to the annular portion, the radial inner surface of each of said first and third sides having a recess which is the same size and shape as said latches, each recess having clips which extend radially inward and which are the same size and shape as said clip-receiving openings, and the second and fourth sides of the annular portion having radial inner surfaces provided with radially outwardly extending indentations the size and spacing of which are the same as those of said openings in said latches.

* * * * *